United States Patent
McGowan

(10) Patent No.: US 7,536,597 B2
(45) Date of Patent: May 19, 2009

(54) APPARATUS AND METHOD FOR CONTROLLING POWER, CLOCK, AND RESET DURING TEST AND DEBUG PROCEDURES FOR A PLURALITY OF PROCESSOR/CORES

(75) Inventor: Robert A. McGowan, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 294 days.

(21) Appl. No.: 11/411,683

(22) Filed: Apr. 26, 2006

(65) Prior Publication Data

US 2006/0248395 A1 Nov. 2, 2006

Related U.S. Application Data

(60) Provisional application No. 60/675,274, filed on Apr. 27, 2005.

(51) Int. Cl.
*G06F 11/00* (2006.01)
(52) U.S. Cl. .......................................... 714/30; 714/31
(58) Field of Classification Search .................. 714/30, 714/31
See application file for complete search history.

(56) References Cited

U.S. PATENT DOCUMENTS

| | | | | |
|---|---|---|---|---|
| 5,459,737 A | * | 10/1995 | Andrews | ..................... 714/733 |
| 5,636,227 A | | 6/1997 | Segars | |
| 5,983,014 A | | 11/1999 | Shay | |
| 6,073,254 A | * | 6/2000 | Whetsel | ........................ 714/30 |
| 6,094,729 A | * | 7/2000 | Mann | .......................... 714/25 |
| 6,115,763 A | * | 9/2000 | Douskey et al. | ............... 710/72 |
| 6,314,530 B1 | * | 11/2001 | Mann | .......................... 714/38 |
| 6,324,662 B1 | | 11/2001 | Haroun et al. | |
| 6,665,802 B1 | | 3/2004 | Haroun et al. | |
| 6,704,895 B1 | | 3/2004 | Swoboda et al. | |
| 7,058,862 B2 | | 6/2006 | Whetsel et al. | |
| 7,111,217 B1 | * | 9/2006 | Schultz | ........................ 714/727 |
| 7,213,171 B2 | | 5/2007 | Haroun et al. | |
| 7,313,730 B1 | * | 12/2007 | Ryser | .......................... 714/30 |
| 7,389,456 B2 | | 6/2008 | Whetsel et al. | |
| 7,398,440 B2 | * | 7/2008 | Warren | ....................... 714/724 |
| 7,412,633 B2 | | 8/2008 | Kimelman et al. | |
| 2005/0097519 A1 | | 5/2005 | Larson et al. | |

\* cited by examiner

*Primary Examiner*—Joshua A Lohn
(74) *Attorney, Agent, or Firm*—Mima G. Abyad; Wade J. Brady, III; Frederick J. Telecky, Jr.

(57) ABSTRACT

An interface unit is provided for use with a JTAG test and debug procedure involving a plurality of processor cores. The interface unit is provided with a logic unit that can translate test and debug commands into control signals. The control signals are applied to a power state machine coupled to a processor/core. The state of the power state machine can thereby be controlled and therefore the parameters of the associated processor/core, i.e., the power and clock parameters of the processor/core. In addition, the logic unit can generate control signals for activating switches, switches that controllably selective apply the TRST signal and the TMS signal to the TAP unit of the processor/core. This capability permits the TAP units of each processor/core to be synchronized.

20 Claims, 4 Drawing Sheets

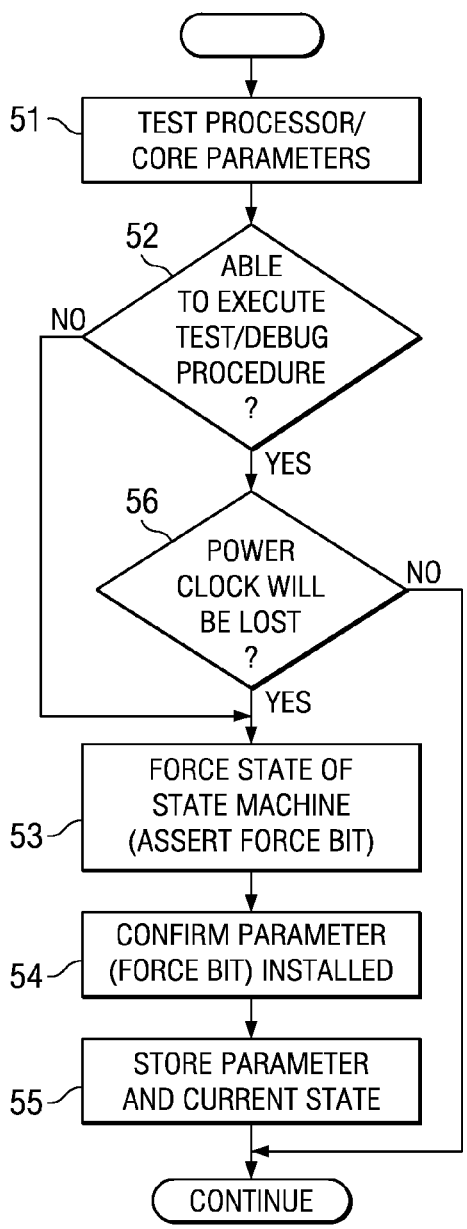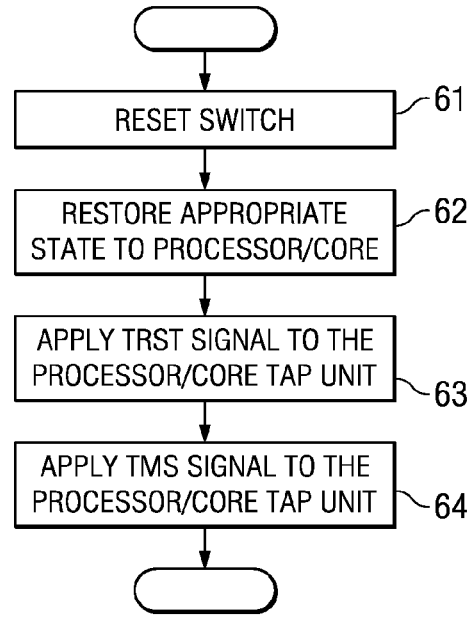

APPARATUS AND METHOD FOR CONTROLLING POWER, CLOCK, AND RESET DURING TEST AND DEBUG PROCEDURES FOR A PLURALITY OF PROCESSOR/CORES

This application is related to provisional U.S. Patent Application Ser. No. 60/675,274, filed Apr. 27, 2005, titled "Apparatus and Method to Facilitate Debug and Test in a Multi-Processor System in the Presence of Lower Power and Security Constraints," for which priority under 35 U.S.C. 119(e) (1) is hereby claimed and which is hereby incorporated herein by reference.

RELATED APPLICATIONS

U.S. patent application No. 11/411,670 entitled Apparatus And Method For Coupling A Plurality Of Test Access Ports To External Test And Debug Facility, invented by Robert A. McGowan and filed on even date herewith; and U.S. Patent Application No. 11/411,381 entitled Apparatus And Method For Test And Debug Of A Processor/Core Having Advanced Power Management, invented by Robert A. McGowan and filed on even date herewith are related applications.

BACKGROUND OF THE INVENTION

1. Field of the Invention

This invention relates generally to the test and debug of multiple processors on a chip and, more particularly to the coupling of the test access ports (TAPs) associated with each processor to an external test and debug unit. More specifically, this invention relates to control of selected parameters by the test and debug procedures.

2. Background of the Invention

Today's digital signal processors, microprocessor, and complex logic cores facilitate test via a limited pin interface called the JTAG interface. This interface conforms to the IEEE 1149.1 Test Access Port (TAP) protocol and requirements. Modern processor units often use the JTAG interface to provide access to in-circuit emulation (ICE) logic in order to facilitate debug of an embedded processor or logic system-on-a-chip designs. The processor unit often has multiple processors/cores, each processor/core having its own TAP.

The IEEE1149.1 specification has two ways in which multiple TAPs can be connected together. In the parallel configuration, a single TDI (test data in) input signal is connected to the TDI input of each TAP in the system. Similarly, the TDO (test data out) output signals from all of the processors/cores are wired together. A separate TMS control signal for each TAP is used to drive each TAP state independently. The controller assures that only one TAP at a time is put into a state in which it responds to the TDI input signals and transmits the TDO output signals.

The problem with a parallel configuration is that each TAP requires its own TMS control signal. On a system-on-a-chip with multiple processor/cores, this configuration would require several pins on the device. In addition, each of these pins would need to be coupled to a JTAG controller. This coupling would require additional signals on the processor unit board and the connector to the JTAG controller. This solution to the problem of multiple TAPS is not conveniently scalable. Since only one TAP can drive its TDO output at the same time, the parallel solution also does not facilitate co-emulation in which multiple TAPs need to be driven through the TAP state machine at the same time.

With the parallel configuration, one or more TAPs can be turned off or un-powered while preserving the ability to performs scans to active TAPS. However, once a TAP becomes inactive, there is no way for a controller to wakeup the module and re-enable scans.

The series configuration is the more common configuration for connecting multiple TAPs. This configuration requires that all TAPs be clocked with the same clock and the serial output of one TAP is used as the serial input to the next TAP in the system. This configuration supports both debug and test procedures.

There are several problems with the series test configuration. First, if the power is removed from one TAP in the series, then the controller will be unable to shift data into and out of any TAP linked in series with the un-powered TAP. Once a TAP has been un-powered, the scan controller is not able to wakeup the sleeping module. The second problem is that all TAPs must be clocked at the same frequency. Consequently, the maximum clock frequency is limited by the slowest component in the system. Synthesizable ARM processors from ARM Ltd exacerbate this problem since the JTAG TCK (test clock) clock signal must be synchronized with the ARM processor functional clock. This synchronized TCK signal, called the RTCK signal, must be used as the TCK signal for all other components linked in series with the ARM processor. Therefore, if the ARM clock is running at a slow frequency or is turned off, scanning through any of the TAPs in series with this core is not possible.

Another problem with the series configuration of TAPs is that to access one particular TAP, the controller must scan through all of the TAPs in the series. This feature makes scaling difficult. Systems or even systems-on-a-chip may have hundreds of processors. This complexity leads to a scan path that is thousands of bits long. A long scan path significantly slows debug of a selected processor core.

The series configuration also presents problems for production testing. Typically, the test vectors used in a production test are written for a single TAP. The test harness does not have an automated method to understand that other TAPs may precede or follow the TAP under test in the JTAG series. For each system, these test vectors must be rewritten to accommodate several TAPs in series.

In order to protect confidential information being processed on an embedded device, some devices are equipped with security features to block viewing of some data. Security features on a system may also be used to protect intellectual property, such as algorithms, drivers, or other software. Because debug procedures use the TAP on a processor to access ICE logic, security logic often disables the TAP on the protected core. In past designs, the TAP was disabled by gating the TCLK signal, which is the TAP clock signal.

Gating the TCLK signals presents several problems. First, gating the TCLK signal at the device level blocks debug and test procedures access to all TAPs and hence all processor/cores to in the system. This unsophisticated technique does not allow for visibility in the protected system while blocking visibility into other systems. Even if the TCLK signal was gated closer to the processor/core's TAP, this implementation would not help because the TAPs are connected in series. For the shifting through the series TAPs to be implemented, the TCLK signal must be enabled to all TAPs in the chain. The second problem is that blocking visibility into the system is in direct conflict with the needs of debug procedures that seek to give full visibility into the system. A method is needed to selectively and dynamically enable or disable access to all TAPs in a system.

Referring to FIG. 1, the configuration for testing a plurality of processor/cores 11-1N fabricated on a circuit board 1 according to the prior art is shown. Processor/cores 11-1N each include a Test Access Port (TAP) unit 111-11N, respectively. A host processing unit 3, the apparatus that controls the testing of the processor/cores 11-1N, exchanges signals with an emulation unit 2. The emulation unit 2 formats the signals received from the host processing unit and applies the resulting signals to TAP units 11-1N. Each TAP unit 11-1N receives the TMS signal, the TCLK signal and the TRST signal. With respect to the TDI and TDO signals, the TAP units are coupled in series, the TDI signal being applied to the first TAP unit 11 in the series and the TDO signal being received from the last TAP unit 1N in the series.

Referring to FIG. 2, a block diagram of a TAP unit 20 according to the prior art is shown. The TAP unit 20 includes a state machine 21. The state machine, in response to the TMS signal, the TRST signal, and the TCLK signal generates control signals that control the sequencing and activity of the TAP unit 21. The TDI signal is applied to the switch unit 23. Switch 23 directs the TDI signals to the IR register 25 or to one of the DR registers 26-2N. The output signals of the registers are applied to the multiplexer 24, the output of the multiplexer 24 being the TDO signal. When the TDI is applied to the IR register 25, the contents of the IR register are applied to a logic unit 22. The logic unit 22 provides control signals that specify a test and debug activity.

The operation of the TAP unit 20 can be summarized as follows. A value is entered in the IR register 25. In response to the value, an activity is implemented by control signals generated by the logic unit 22. This result of a value in the IR register can be a transfer of a value from the DR register to a register in the processor/core result or can result in the transfer of a value in a processor/core register to a DR register. One predetermined value in the IR register 25 results in a logic "1" being set in the bit-by-pass register 29. Thus, in the example of a plurality of TAP units, a string of logic signals entered in all the IR registers and synchronized by the state machine, can short circuit one or more designated TAP units by setting the logic "1" in the by-pass bit register. When the contents of a string of DR registers in the TAP unit sequence is read out, the designated by-pass bit registers provide only a logic "1" output, in essence, providing a short circuit for the test and debug activity for the processor/core associated a designated tap register.

One of the problems that can arise in the test and debug procedures is that the processor/core being tested is not in an appropriate state for testing. For example, the power to processor/core can be removed from part or from all of the processor/core, rendering testing impossible. The power may be reduced as part of an energy management scheme. Similarly, the system clock of the processor/core can be altered, either as a power control feature or for some other reason. Finally, the state machine of a processor/core TAP unit may be in an inappropriate state. The state machine of the TAP unit must be synchronized with the TAP units of the other processor/cores for the test and debug procedures A need has therefore been felt for apparatus and an associated method having the feature of improving test and debug procedures. It is a more particular object of the apparatus and associated method to permit selective testing of a number of a plurality of processor. It is yet a further object of the apparatus and associated method to activate the selected processor/cores using JTAG test and debug procedures. It is a still further feature of the apparatus and associated method to provide a technique for determining the status of selected processor/core parameters for certain processor/cores. It is more particular feature of the apparatus and associated method to provide an interface unit between the test and debug apparatus and a plurality of processor/cores that can facilitate the test and debug procedures. It is a still further particular feature of the apparatus and associated method to provide an interface unit that includes a TAP unit. It is yet another particular feature of the apparatus and associated method to provide a status registers providing the status of the plurality of processor/cores under test. It is still another feature of the apparatus and related method to permit the test and debug procedures to control certain processor/core parameters. It is a still further feature of the apparatus and associated method to provide a technique for controlling the power and clock parameters of a processor/core. It is yet another feature of the apparatus and associated method to be able to synchronize the TAP unit state machines for all processor/cores being tested.

SUMMARY OF THE INVENTION

The aforementioned and other features are provided, according to the present invention, by an interface unit between a plurality of TAP units of processor/cores on a substrate and a test and debug unit. The interface unit includes a TAP unit. The interface unit and the processor/cores have a switch unit coupled to each TAP unit. The interface unit includes a logic unit for translating the command signals from the test and debug unit into control signals. In this manner, control signals can be generated that are applied to the power state machine coupled to the processor/core. The control signals can control the state of the processor/core and consequently the power and clock parameters. The logic unit, in response to test and debug commands, generates control signals operating switches in each switch unit associated with a processor/core. In this manner, the TRST signal and the TMS signal, which are applied to input terminals of the switch units, can controllably be applied to the state machine of the processor/core TAP unit. The state of the TAP units of the processor/cores can thereby be synchronized.

These and other features and advantages of present invention will be more clearly understood upon reading of the following description and the accompanying drawings and the claims.

BRIEF DESCRIPTION OF THE DRAWINGS

FIG. 5 is a flow chart illustrating how the processor/core is set to an appropriate state according to the present invention.

FIG. 6 is flow chart illustrating the technique by which a processor/core, after being reincorporated in a test sequence, is resynchronized with the other processor/cores.

DESCRIPTION OF THE PREFERRED EMBODIMENT

1. Detailed Description of the Figures

Figure 1:
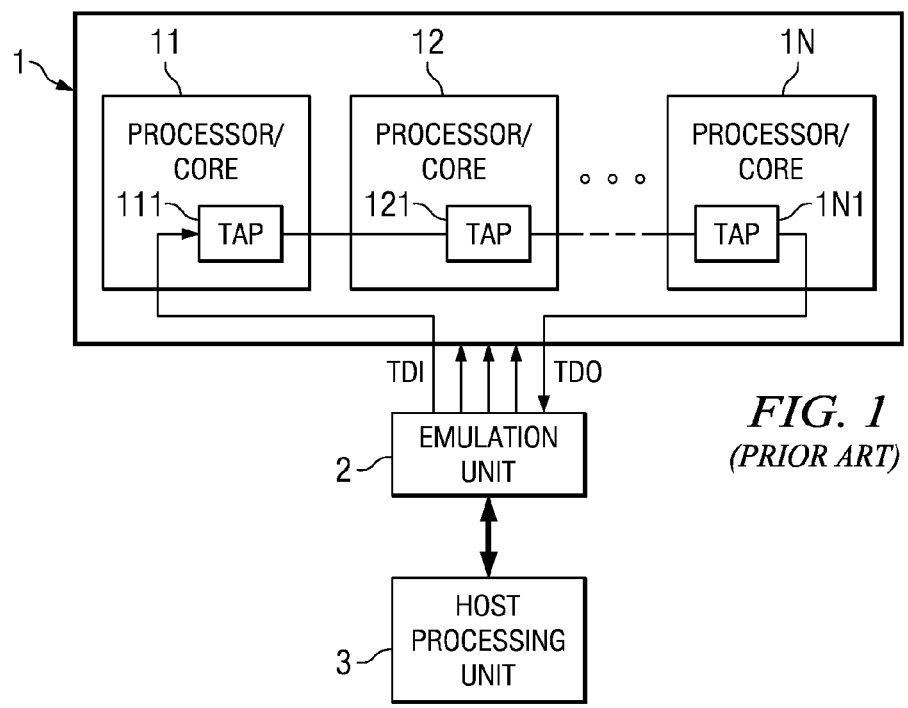
FIG. 1 is block diagram of the apparatus for providing a JTAG interface between an emulation unit and a plurality of processor/core devices.
Figure 2:
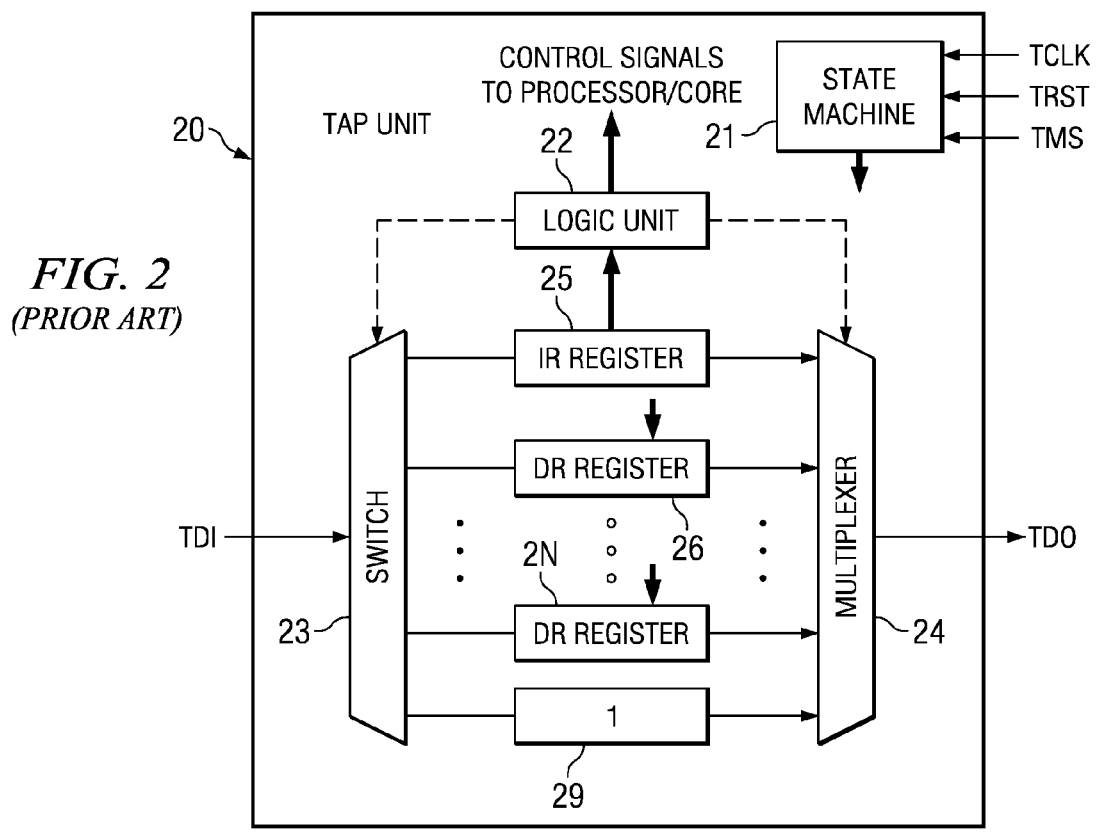
FIG. 2 is a block diagram of a TAP unit according to the prior art.
Figure 3:
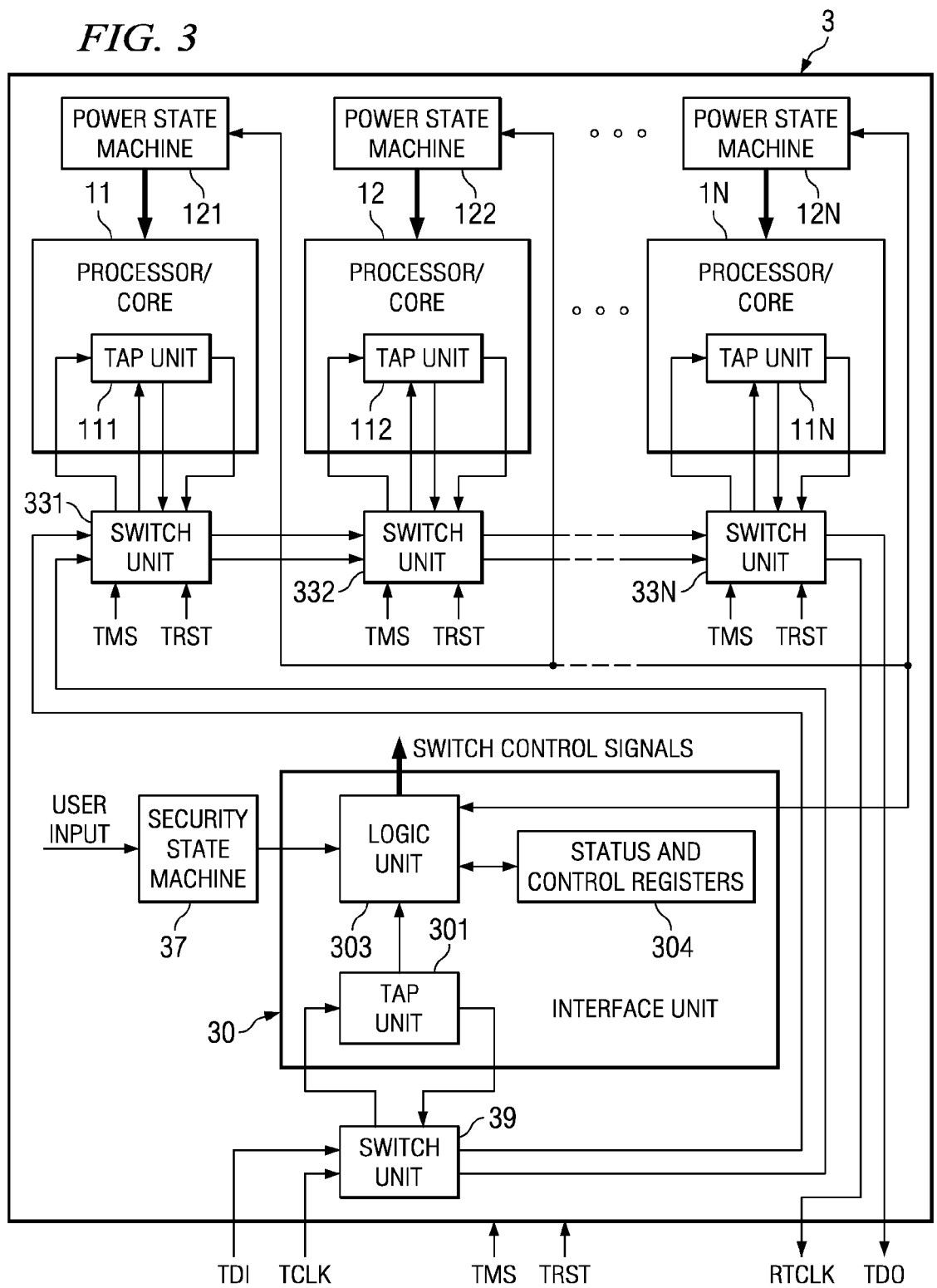
FIG. 3 is a block diagram of the apparatus for providing an interface between an emulation unit and a plurality of processor core devices.

Referring to FIG. 3, a block diagram of the interface unit 30 mitigating the transfer of data between the plurality of processor/cores 11-1N and the test and debug apparatus is shown. The portion of the current invention that differs from FIG. 1 is designated by numbers beginning with the number three. Coupled to the TAP units 111-11N of each processor/core are switch units 331-33N, respectively. The interface unit 30 includes a TAP unit 301. The TAP unit 301 of the interface unit 30 is coupled to switch unit 39. The switch units 39 and 331-33N are coupled in series. The TDI signal from the test and debug unit, i.e., the emulation unit 2 and the host processing unit 3 of FIG. 1 and FIG. 3, is applied to an input terminal of switch unit 39. The output terminal of switch unit 39 is applied to the input terminal of switch unit 331. The input terminal of each switch unit, except for switch unit 39, is coupled to the output terminal of the previous switch unit. The output terminal of switch unit 33N has the TDO signal applied thereto and the TDO signal is returned to the test and debug apparatus. Similarly, the TCLK signal from the test and debug apparatus is applied to a second input terminal of switch unit 39. The TCLK signal is applied to a second input terminal of switch unit 331 and, consequently, through the series-connected switch units 331-33N. From a second output terminal of switch unit 33N, the RTCLK signal is applied to the test and debug unit. The interface unit 30 includes TAP unit 301. Signals from the TAP unit 301 are applied to logic unit 303. The logic unit 303 provides the control signals for all of the switch units 331-33N and 39. In addition, in response to preselected values in the IR register of the TAP unit 30, the values of designated status and control registers 304 will be transferred to a DR register. The status and control registers 304 store information with respect to the power and status for each processor core. The values in the status registers originate in the processor/cores themselves, or originate from the control signals that set the power, clock, and security parameters in the processor/cores.

The values in the status registers permit the test and debug apparatus to determine when a processor/core is available for testing. The determination of the availability of each processor/core can be done with the same JTAG procedures as are used in the actual test and debug procedure.

Each processor/core 11-1N has a power state machine 121-12N, respectively, coupled thereto. The power state machines 121-12N control the power level of the coupled processor/core. The power state machines are coupled to the logic unit 303 in the interface unit. Through the logic unit 303, the status of the power state machine is coupled to and entered in the status and control registers 304. The status and control registers 304 store the status of the power applied to the coupled processor/core. The status of the power applied to each processor core can be communicated to the test and debug unit through the interface TAP unit. In this manner, the test and debug unit can determine whether the power applied to the coupled processor/core is appropriate for test and debug procedures.

The logic unit 303 is coupled to the power state machines 121-12N and to the status and control register. The state of the power state machine is transmitted to the logic unit 303 and consequently is stored in the status and control registers 304 in response to commands from the test and debug unit can specify the state of each power state machine.

Figure 4:
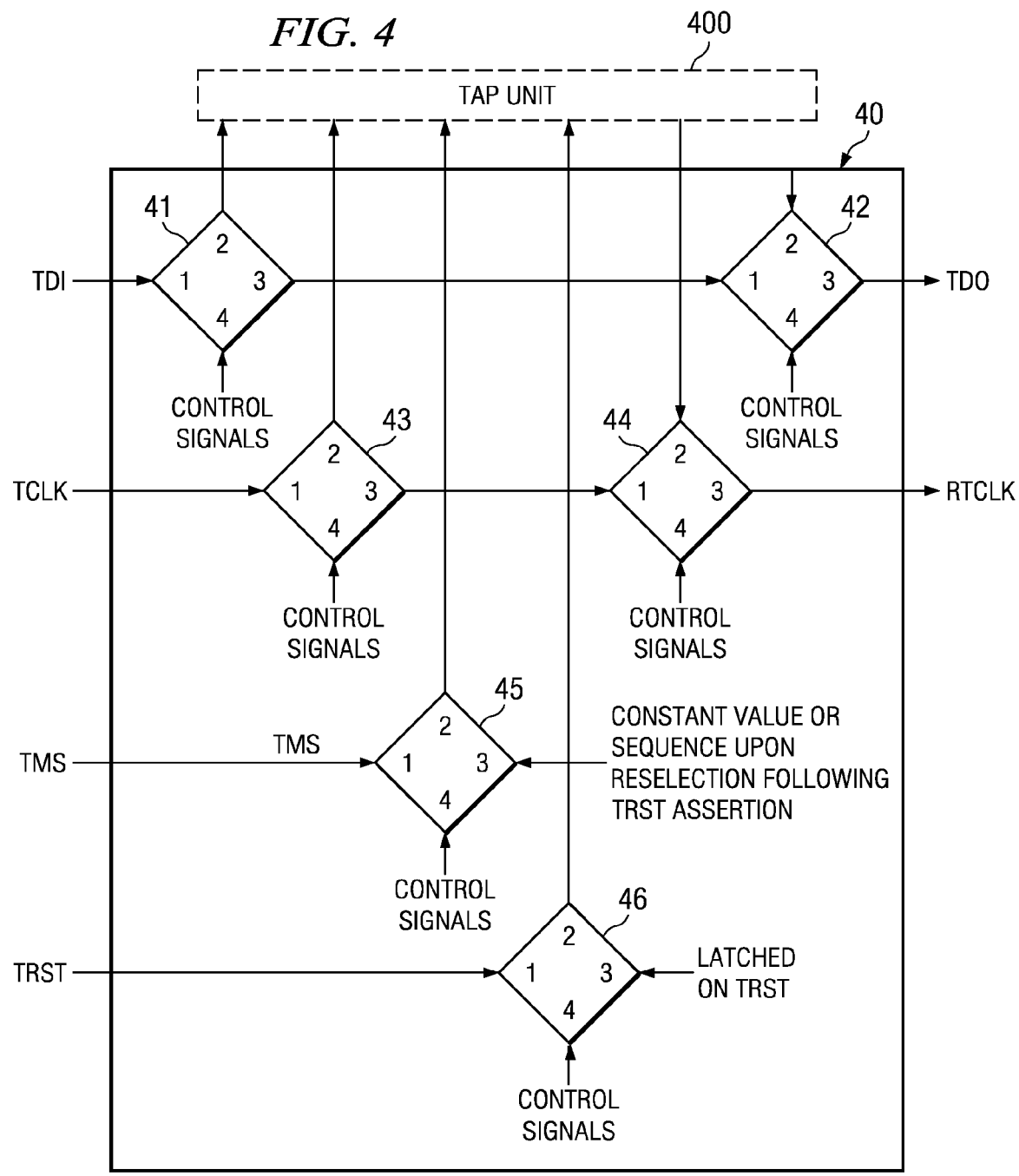
FIG. 4 is a block diagram of the switch unit associated with each processor/core and associated with the interface unit according to the present invention.

Referring to FIG. 4, a block diagram of the switch unit 40 associated with each processor/core and the interface unit, according to the present invention is shown. The TDI signal is applied to a first input terminal of switch 41. In response to control signals applied to terminal 4 of switch unit 41, the output signal of switch 41 is applied to the associated TAP unit or to an input terminal 2 of switch 42. Input terminal 2 of switch 41 is coupled to the associated TAP unit. The control signals applied to input terminal 4 of switch 42 determines whether the signal applied to input terminal 1 or the signal applied to the input terminal 2 of switch is applied to output terminal 3 and is the TDO signal. The TCLK is applied to the input terminal 1 of switch 43. In response to control signals applied to terminal 4 of switch 43, the output signal of switch 43 is applied through terminal 2 to the associated TAP unit or through terminal 4 to the input terminal 1 of switch 44. In response to control signals applied to terminal 4 of switch 44, the RTCLK signal applied to terminal 3 is selected for the output signal. The presence of the switches permit test and debug procedures to test one or a selected number of the processor/cores in a single operation. The disadvantage of the testing of more than one processor/core is that a plurality of signals groups must generated to test the designated processor/cores and a plurality of signal groups must be analyzed by the processor. The TMS signal is applied to an input terminal 1 of switch 45. In response to control signals applied to terminal 4 of switch 45, the TMS signal is applied to TAP unit 400. Similarly, switch 46 controls the application of the TRST signal to the TAP unit 400.

Referring to FIG. 5, a flow chart for the placing (forcing) a processor/core into a selected state, i.e., a state having selected power and clock parameters, is shown. In step 51, a test is made of the parameters of the designated processor/core. This test is performed by having the logic unit read the statuses of the designated processor/core and store them in the register unit. This parameter or these parameters are applied to the interface TAP unit and transferred to the test and debug unit. In the test and debug unit, a determination is made if the parameters of the processor/core permit the test and debug procedures to be performed in step 52. When the answer is no in step 52, then the test and debug unit formulates a command, a command which is then applied to the interface TAP unit and then to the logic unit. Based on the received command, the logic unit then applies control signals (e.g., assert force bit) to the state machine of the designated processor/core. The state machine then assumes the state in which the processor/core has the appropriate parameters in step 53. When the state machine confirms to the logic unit that the designated parameters have been acted upon in step 54, the parameters are stored in the register unit 55. Whenever the parameters for the processor/core are changed, this change is reflected in the parameter values stored in the register unit. At this time the status bits in the register unit 55 for clock and/or power now properly reflect the current state after appropriate response to the command.

Referring to FIG. 6, the technique by which a processor/core, not included in the test chain of processor/cores, is resynchronized, i.e., becomes a member of the test chain is shown. In step 61, the switch associated with the processor/core is initialized. In step 62, the appropriate (power) state is restored when necessary, e.g., as illustrated in FIG. 5. In step 63, the TRST signal is applied to the state machine in the TAP unit of a processor/core that was previously inactive or was in an inappropriate state. This activity places the TAP unit state machine in the Test Logic Reset state. The TMS signal is applied to the processor/core TAP unit state machine, thereby placing the state machine in the Run Test Idle state in step 64. At this point the processor/core is now synchronized with the other processor/cores. When, in step 52, the answer is yes, then a determination is made whether the power clock will be lost during the test procedure. If the answer is no, then the procedure continues. When the power will be lost then the procedure goes to step 53 to force the correct power parameters.

As indicated before with respect to the RTCLK signal, this signal is not a member of the JTAG signal set. However, some processor cores, such as ARM units, the TCLK signal is processed by the processor/core and the processed signal is referred to as the RTCLK signal. As will be clear, the present invention can work equally well with and without the generation of the RTCLK signal.

2. Operation of the Preferred Embodiment

The operation of the present invention can best be understood in the following manner. On a chip having a plurality of processor/cores, each processor core is provided with a TAP unit to provide the interface to JTAG signals. The processor/core TAP units are coupled in series. An interface unit is provided that includes a TAP unit. The interface unit TAP unit is coupled in series with the series-coupled TAP units of the processor cores. A first set of switches is provided for each TAP unit. In response to control signals, the TDI terminal and the TDO terminal for a selected TAP unit can be short circuited. Similarly, in response to second control signals, the TCLK terminal and the RTCLK terminal are coupled together, i.e. short circuited. The control signals are generated in response to TDI signals applied to the interface unit TAP unit by the test and debug unit. In response to the TDI signal, the logic unit of the interface unit can implement the encoded commands. In this manner, the switches can set such that only one TAP unit receives the TDI and TCLK signals. The ability to control the state of each switch unit permits the selection and therefore the testing of a selected individual processor/core. A plurality of processor/cores can be selected. In this manner, a plurality of processor/cores can be tested simultaneously. The ability of the testing of a plurality of processor/cores requires that test and debug unit generate a string of data signals capable in the single access by the test and debug apparatus of placing appropriate bits in the plurality of TAP unit IR registers of the selected processor/cores. Similarly, when the test and debug apparatus receive the results of testing the plurality of processor/cores, the test and debug apparatus will have to sort out the responses from each selected processor/core from a string of data bits from a plurality of DR registers.

The interface unit includes a plurality of status registers. Typical parameters stored in the status registers relate to power, clock and security conditions. Each of these conditions determines the ability to test the processor/core described by the parameters. When the processor/core is not available for test, e.g., the power is off, this information is transmitted through the interface unit TAP unit to the test and debug unit. The test and debug unit then transmits signal groups through the interface unit TAP unit to the logic unit appropriate signals that result in control signals being transmitted to the switch unit associated with the (powered-off) processor/core. The control signals then place the switch in a short circuit mode and the TDI and TCLK signals are not applied to the (powered-off) processor/core. This procedure prevents the test and debug procedure from being halted because of a condition in one of the processor/cores.

With respect to the RTCLK signal, this clock signal is a result of a peculiarity of the ARM unit wherein, in order to use the JTAG test and debug procedures, the TCLK signal must be synchronized with the internal clock of the ARM unit. The resulting (synchronized) signal is referred to as the RTCLK signal and, according to one embodiment of the invention, when a single ARM unit is in the scan chain, the RTCLK signal from the single ARM unit can, depending on the state of the switches, either be applied to each scan chain TAP unit or pass through each scan chain TAP unit. The state of each switch of the scan chain is controlled by the logic unit in the interface unit and, ultimately, by the test and debug unit. When more than one ARM unit is present, then each of the ARM units will provide a different RTCLK signal. The net result of the presence of a plurality of ARM units in the scan chain is to slow the clock rate with the passage of the TCLK or RTCLK signal through the scan chain. When the resulting RTCLK signal is applied to the test and debug unit, the test and debug unit can throttle back the clock rate of the TCLK signal so that the, signals in the scan chain can be shifted in unison.

As indicated, the control signals, generated by the logic unit in the interface unit in response to test and debug commands can be applied to the power state machine associated with each processor/core. Control signals, generated by the logic in the interface unit in response to other test and debug commands, control the application of the TRST signal and the TMS signal and consequently provide a technique for the synchronization of the TAP units of the associated processor/cores.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. An apparatus comprising:

a plurality of processor cores, wherein each processor core is coupled to a respective one power state machine of a plurality of power state machines, wherein each power state machine is configured to control power and clock parameters of the respective processor core, and wherein each processor core comprises a test access port (TAP); and an interface unit coupled to the plurality of power state machines, wherein the interface unit comprises a TAP configured to receive test commands, and wherein the interface unit is configured to selectively provide control signals to the plurality of power state machines to force a parameter change in the respective processor cores in response to a received test command requesting the parameter change.

2. The apparatus of claim 1, wherein the interface unit is further configured to store current parameters of each processor core of the plurality of processor cores.

3. The apparatus of claim 1, wherein the interface unit is further configured to, in response to a received test command, communicate current parameters of at least one processor core to a test and debug unit using the TAP of the interface unit.

4. The apparatus of claim 1, wherein each power state machine is further configured to confirm to the interface unit that a requested parameter change is completed.

5. The apparatus of claim 1, further comprising:

a plurality of switch units, wherein each switch unit is coupled to the TAP of a respective one processor core of the plurality of processor cores, and wherein each switch unit is coupled to receive a test signal from a test and debug unit, and wherein the interface unit is coupled to the plurality of switch units to selectively provide control signals to the plurality of switch units, and wherein the interface unit is further configured to, in response to a received test command, selectively provide control signals to at least one of the switch units to cause the at least one switch unit to apply the received test signal to the respective TAP.

6. The apparatus of claim 5, wherein the test signal is a JTAG test signal.

7. The apparatus of claim 5, wherein the test signal is one selected from a group consisting of a JTAG test reset signal (TRST) and a JTAG test mode select (TMS) signal.

8. The apparatus of claim 1, wherein the plurality of processor cores are on a same substrate.

9. method comprising:

receiving a test command in a test access port (TAP) of an interface unit coupled to a plurality of power state machines, wherein each power state machine is coupled to a respective one processor core of a plurality of processor cores to control power and clock parameters of the respective one processor core, wherein each processor core comprises a TAP, and wherein the test command requests a parameter change in at least one processor core of the plurality of processor cores; and sending, by the interface unit, control signals to the power state machine coupled to the at least one processor core, wherein the parameter change is forced.

10. The method of claim 9, further comprising:

receiving, by the interface unit, confirmation from the power state machine that the parameter change is complete.

11. The method of claim 10, further comprising: storing the changed parameters in the interface unit in response to the confirmation.

12. The method of claim 9, further comprising: storing current parameters of each processor core in the interface unit.

13. The method of claim 9, further comprising:

sending, by the interface unit, current parameters of the at least one processor core to a test and debug unit responsive to a test command.

14. The method of claim 9, further comprising:

receiving a test signal from a test and debug unit at a switch unit coupled to the TAP of the at least one processor core; and sending, by the interface unit in response to a test command, control signals to the switch unit to cause the switch unit to apply the test signal to the TAP.

15. The method of claim 14, wherein the test signal is one selected from a group consisting of a JTAG test reset signal (TRST) and a JTAG test mode select (TMS) signal.

16. An apparatus comprising:

a processor core comprising a processor test access port (TAP), wherein the processor TAP is operable to control testing of the processor core;

a power state machine controllably coupled to the processor core to change clock and power parameters of the processor core; and an interface unit controllably coupled to the power state machine, wherein the interface unit comprises an interface TAP operable to receive test commands and the interface unit is operable to force a change to the clock and power parameters responsive to a test command received by the interface TAP.

17. The apparatus of claim 16, wherein the interface unit is controllably coupled to the processor TAP to cause a test signal received from a test and debug unit to be applied to the processor TAP in response to a test command received by the interface TAP.

18. The apparatus of claim 17, wherein the test signal is one selected from a group consisting of a JTAG test reset signal (TRST) and a JTAG test mode select (TMS) signal.

19. A method for testing a processor core controllably coupled to a power state machine, the method comprising:

receiving test commands for testing the processor core at a processor test access port (TAP) comprised in the processor core;

receiving test commands to request changes to power and clock parameters of the processor core at an interface TAP of an interface unit controllably coupled to the power state machine; and forcing a change to the parameters in response to a test command received by the interface TAP.

20. The method of claim 19, further comprising:

applying a test signal received from a test and debug unit to the processor TAP in response to a test command received by the interface TAP, wherein the interface unit is controllably coupled to the processor tap to cause the application of the test signal.

* * * * *